United States Patent
Zhuge et al.

(10) Patent No.: US 12,315,374 B2
(45) Date of Patent: May 27, 2025

(54) AIRPORT CONTROL DECISION SUPPORT SYSTEM AND METHOD BASED ON SEMANTIC RECOGNITION OF CONTROLLER INSTRUCTION

(71) Applicants: CIVIL AVIATION UNIVERSITY OF CHINA, Tianjin (CN); THE SECOND RESEARCH INSTITUTE OF CAAC, Chengdu (CN)

(72) Inventors: Jingchang Zhuge, Tianjin (CN); Qian Luo, Tianjin (CN); Ye Pan, Tianjin (CN); Chang Liu, Tianjin (CN); Yi You, Tianjin (CN); Zhiwei Xing, Tianjin (CN)

(73) Assignees: CIVIL AVIATION UNIVERSITY OF CHINA, Tianjin (CN); THE SECOND RESEARCH INSTITUTE OF CAAC, Chengdu (CN)

(*) Notice: Subject to any disclaimer, the term of this patent is extended or adjusted under 35 U.S.C. 154(b) by 376 days.

(21) Appl. No.: 18/061,050

(22) Filed: Dec. 2, 2022

(65) Prior Publication Data
US 2023/0177969 A1   Jun. 8, 2023

Related U.S. Application Data

(63) Continuation of application No. PCT/CN2021/098173, filed on Jun. 3, 2021.

(30) Foreign Application Priority Data

Jun. 8, 2020   (CN) .......................... 202010511325.1

(51) Int. Cl.
*G08G 5/00*   (2025.01)
*G08G 5/51*   (2025.01)
(Continued)

(52) U.S. Cl.
CPC ................. *G08G 5/00* (2013.01); *G08G 5/51* (2025.01); *G08G 5/727* (2025.01); *G10L 15/02* (2013.01);
(Continued)

(58) Field of Classification Search
CPC ............ G08G 5/00; G08G 5/51; G08G 5/727; G08G 5/56; G10L 15/02; G10L 15/063;
(Continued)

(56) References Cited

U.S. PATENT DOCUMENTS 6,972,694 B2 * 12/2005 Carroll ............... B64D 45/0059
340/963
9,830,910 B1 * 11/2017 Shapiro ................ G08G 5/0013
(Continued)

*Primary Examiner* — Richard M Camby
(74) *Attorney, Agent, or Firm* — Chiesa Shahinian & Giantomasi PC

(57) ABSTRACT

Disclosed are an airport control decision support system and method based on semantic recognition of a controller instruction. The system includes a speech acquisition module, a noise processing module, a speech recognition module, a semantic recognition module, a conflict recognition module, and an alarm display terminal. The system can effectively eliminate accidents and potential accidents thereof caused by human factors in a control process, and can improve safety of aircraft ground operation. Different from ordinary speech recognition and semantic recognition, data annotation of pronunciation and intonation is performed based on special pronunciation of air traffic control, and finally a speech database that conforms to airport control standard phrases is constructed. The airport control decision support system is implemented by installing a speech acquisition device and the alarm display terminal in a control seat, and thus the system is economical and practical.

4 Claims, 1 Drawing Sheet

(51) Int. Cl.
| | |
|---|---|
| *G08G 5/72* | (2025.01) |
| *G10L 15/02* | (2006.01) |
| *G10L 15/06* | (2013.01) |
| *G10L 15/16* | (2006.01) |
| *G10L 15/18* | (2013.01) |
| *G10L 15/197* | (2013.01) |
| *G10L 15/22* | (2006.01) |
| *G10L 15/30* | (2013.01) |
| *G10L 21/0232* | (2013.01) |
| *G10L 25/63* | (2013.01) |

(52) U.S. Cl.
CPC ............ *G10L 15/063* (2013.01); *G10L 15/16* (2013.01); *G10L 15/1815* (2013.01); *G10L 15/197* (2013.01); *G10L 15/22* (2013.01); *G10L 15/30* (2013.01); *G10L 21/0232* (2013.01); *G10L 25/63* (2013.01)

(58) Field of Classification Search
CPC ... G10L 15/16; G10L 15/1815; G10L 15/197; G10L 15/22; G10L 15/30; G10L 21/0232; G10L 25/63; G10L 21/0208; G10L 15/26; G10L 15/20; A61K 40/4262; H10D 30/797; H10D 64/311; H10D 30/0327; H10F 77/1692; A23B 40/00; G06F 40/30
See application file for complete search history.

(56) References Cited

U.S. PATENT DOCUMENTS

| | | | | |
|---|---|---|---|---|
| 10,587,635 | B2* | 3/2020 | Keller | H04L 63/1425 |
| 2005/0258943 | A1* | 11/2005 | Mian | B64D 45/0053 |
| | | | | 340/426.1 |
| 2018/0068332 | A1* | 3/2018 | Kajak | G06Q 30/0203 |
| 2018/0288080 | A1* | 10/2018 | Keller | H04L 63/1425 |

* cited by examiner

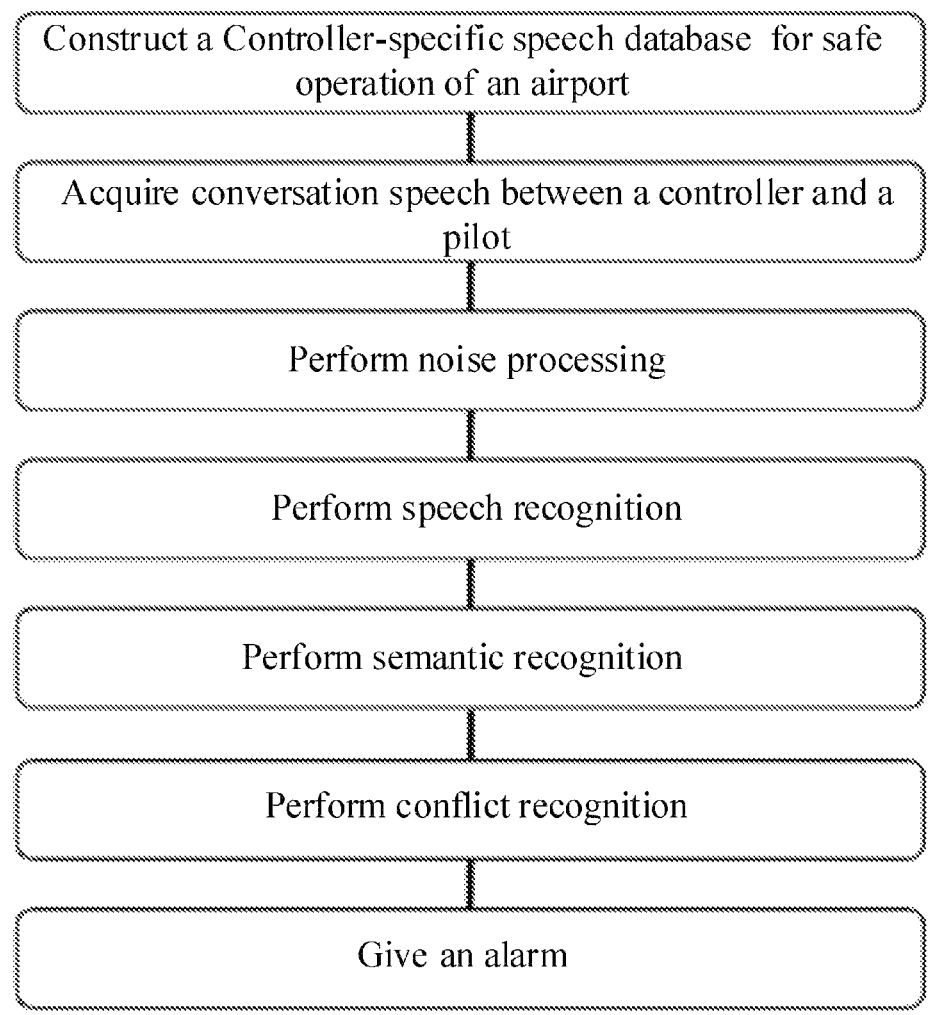

AIRPORT CONTROL DECISION SUPPORT SYSTEM AND METHOD BASED ON SEMANTIC RECOGNITION OF CONTROLLER INSTRUCTION

CROSS REFERENCE TO RELATED APPLICATION

This application is a Continuation of International Application No. PCT/CN2021/098173, filed on Jun. 3, 2021, which claims the benefit and priority of Chinese Patent Application No. 202010511325.1, filed Jun. 8, 2020; the disclosures of all of which are incorporated herein by reference in their entirety.

TECHNICAL FIELD

The present disclosure relates to the technical field of airport flight area operation management, and in particular, to an airport control decision support system and method based on semantic recognition of a controller instruction.

BACKGROUND

Current semantic recognition systems have not desired for control instruction of airport operation, especially the control instruction for aircraft taxiing guidance. The reason is that a recognition rate of speech recognition technology cannot meet safety requirements of airport air traffic control for the time being, and semantic recognition of a control instruction is not brought into focus due to limitations in the speech recognition technology. In addition, because of a unique pronunciation in speech for air traffic control, it is necessary to construct a special speech database. The existing airport control decision support system needs assistance of a device such as surface movement radar, or depends on an advanced surface movement guidance and control system, which involves equipment installation, maintenance, transformation, etc., so it is deficient in practicality and economy.

Currently, large airports, especially hub airports, in various countries all over the world are in a state of high-load operation for a long time. The busier the airport is, the greater the demand for scheduling controllers and aircraft is. As air traffic controllers become increasingly busier in the existing control process, error rate of the controllers also increase. However, at present, most countries in the world still adopt a traditional manual control mode, which cannot meet the rapid growth of airport control demand in China. In a control seat, several controllers have to manually deploy more than a dozen or even dozens of aircrafts. It has led to many serious civil aircraft accidents under the current control mode. A research shows that air traffic control unsafe events caused by the controller's personal factors, such as mistakes, forgetting and omissions, account for 48.9%. The air traffic controller's human factors have become the most important factors leading to air traffic control accidents or unsafe events.

SUMMARY

To resolve the foregoing problems, an objective of the present disclosure is to provide an airport control decision support system and method based on semantic recognition of a controller instruction.

To achieve the foregoing objective, an airport control decision support system based on semantic recognition of a controller instruction according to the present disclosure includes a speech acquisition module, a noise processing module, a speech recognition module, a semantic recognition module, a conflict recognition module, and an alarm display terminal, where the speech acquisition module is configured to acquire a speech conversation between a controller in an airport control seat and a pilot; the noise processing module is configured to filter out very high frequency (VHF) communication noise and high background noise of the airport in the acquired speech conversation, so as to reduce noise interference, and incorporate an amplifier to increase a signal-to-noise ratio; the speech recognition module is configured to perform, based on a constructed controller-specific speech database and speech characteristics of the controller and the pilot, speech recognition on the speech conversation after noise processing; the semantic recognition module is configured to extract element information of the controller instruction based on the speech recognition, to provide a guarantee for aircraft conflict recognition; the conflict recognition module is configured to deduce, based on a result of the semantic recognition, a process of an aircrafts taxiing in accordance with the controller instruction and positions of the aircraft at each time point, analyze an aircraft conflict phenomenon including aircraft illegal approach during the taxiing, and generate an alarm signal based on a probability of the aircraft conflict; and the alarm display terminal is configured to display the result of the semantic recognition, the probability of an aircraft conflict, and detailed information of a possible conflict to the controller, and generate, based on the probability of the aircraft conflict, different levels of audible and visual alarms that are easy to distinguish.

An airport control decision support method using the airport control decision support system based on semantic recognition of a controller instruction according to the present disclosure includes the following steps that are sequentially performed:

(1) constructing a controller-specific speech database for safe operation of an airport;

acquiring, based on an airport control workflow, a flight area-related operation management standard, information content of a controller instruction, and a controller's standard phrasebook "Air Traffic Radio Communication Terms", speech data and a pronunciation text in three ways: backing up a ground-air communication record between a controller in an airport and a pilot, using a VHF communication device or a tower speech access device to acquire information about a speech conversation between the controller and the pilot, and using a speech file of "Air Traffic Radio Communication Terms"; segmenting the pronunciation text of the controller and the pilot, marking the speech data with segments and prosody, to form a data set composed of marked speech files that conform to airport control standard phrases, and finally constructing the controller-specific speech database for safe operation of an airport;

(2) acquiring, by a speech acquisition module, the speech conversation between the controller and the pilot based on the controller-specific speech database;

separately acquiring, based on the controller-specific speech database for safe operation of an airport, controller instructions of seats including a release seat, a ground seat and a tower seat, and pilot speech, and then training the speech based on an intelligent learning method, to accurately recognize speech of special terms of different seats;

(3) performing, by a noise processing module, noise processing on the acquired speech conversation;

filtering out, by the noise processing module, VHF communication noise and high background noise of the airport in the acquired speech conversation, and incorporating an amplifier to increase a signal-to-noise ratio; where the method is to extract a frequency spectrum of the noise, and then perform a reverse compensation operation for the speech with noise based on the frequency spectrum of the noise, so as to obtain a denoised speech conversation;

(4) performing, by a speech recognition module, speech recognition on the denoised speech conversation;

constructing, by a speech recognition model based on a neural network, a speech recognition module with an airport control standard phrase recognition ability; performing, by the speech recognition module, speech recognition on the speech conversation between the controller and the pilot, and obtaining a recognized text;

(5) performing, by a semantic recognition module to perform semantic recognition on the speech conversation after the speech recognition;

extracting, from the controller instruction, element information including a flight number, push-out information, path information, a key position point, a starting point, and a time sequence based on the speech recognition of the controller and the pilot, associatively analyzing a plurality of elements, performing, by using technical means such as word parsing, information extraction, time causality and emotion judgment and in combination with a configuration of an airport flight area, semantic recognition for a plurality of times on the speech conversation after the speech recognition to acquire a large amount of speech data, continuously training the model in the semantic recognition module by using the data, and finally converting the text formed by the speech recognition module into a planned taxiing path of the aircraft;

(6) recognizing, by a conflict recognition module, an aircraft conflict with reference to the planned taxiing path formed by the semantic recognition module;

deducing, by the conflict recognition module, based on the semantic recognition of the controller and the pilot and with reference to historical data about aircrafts of different models taxiing in each area of the flight areas and relevant regulations on safe operation, a process each aircraft taxiing in accordance with the controller instruction and positions of the aircraft at each time point, analyzing, based on civil air traffic management rules and relevant normative documents of safe operation in flight areas, an aircraft conflict phenomenon including aircraft illegal approach during the taxiing, and generating an alarm signal based on a probability of an aircraft conflict; and (7) displaying alarm information by an alarm display terminal;

displaying, by the alarm display terminal based on the aircraft conflict recognition, the semantically-recognized planned aircraft taxiing path, the probability of occurrence of the aircraft conflict, and detailed information of a possible conflict to the controller, and generating, based on the probability of a conflict, different levels of audible and visual alarms that are easy to distinguish.

In step (3), the speech recognition module performs the following specific operation steps:

first preprocessing a denoised speech conversation signal, extracting feature parameters from the denoised speech conversation signal based on the neural network, then training and recognizing an acoustic model, a language model, and a dictionary by using the feature parameters, finally comparing the feature parameters with the trained acoustic model, language model, and dictionary, calculating a corresponding probability by rules, and selecting a result that matches with a maximum probability of the feature parameters, to obtain a text for speech recognition.

The training refers to acquiring model parameters, evaluating the ability of the speech recognition model in recognizing airport control standard phrases, matching with the controller-specific speech database, and optimizing the ability in fitting and generalizing the airport control standard phrases;

The recognition is a process of traversing the controller-specific special speech database;

the acoustic model represents pronunciation of a language built based on the neural network, and is capable of being trained to recognize a controller speech model and features of a tower environment;

The language model is a probability model that regularizes words of the controller-specific speech database; and The dictionary contains a large number of unique professional terms and pronunciation rules in field of a civil aviation control.

The present disclosure has the following advantages:

1. In the present disclosure, in view of hidden dangers of human factors such as mistakes, forgetfulness, and omissions in air traffic control, accidents and accident symptoms thereof caused by human factors in a control process can be effectively eliminated, and safety of aircraft ground operation can be greatly improved.
2. In the present disclosure, different from ordinary speech recognition and semantic recognition, data annotation of pronunciation and intonation is performed based on special pronunciation of air traffic control, and finally a speech database that conforms to airport control standard phrases is constructed.
3. In the present disclosure, the airport control decision support system is implemented only by installing a speech acquisition device and the alarm display terminal in a control seat, without assistance of field surveillance radar, without dependence on an advanced scene activity guidance and control system, and without installation or modification of any device outside the control seat, and thus the system is extremely economical and practical.

BRIEF DESCRIPTION OF THE DRAWINGS

FIG. 1 is a flowchart of an airport control decision support method based on semantic recognition of a controller instruction according to the present disclosure.

DETAILED DESCRIPTION

The various modules, systems and embodiments noted herein can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

The present disclosure is further described in detail below.

An airport control decision support system based on semantic recognition of a controller instruction according to the present disclosure includes a speech acquisition module, a noise processing module, a speech recognition module, a semantic recognition module, a conflict recognition module, and an alarm display terminal, where the speech acquisition module is configured to acquire a speech conversation between a controller in an airport control seat and a pilot; the noise processing module is configured to filter out VHF communication noise and high background noise of the airport in the acquired speech conversation, so as to reduce noise interference, and incorporate an amplifier to increase a signal-to-noise ratio; the speech recognition module is configured to perform, based on a constructed controller-specific database and speech characteristics of the controller and the pilot, speech recognition on the speech conversation after the noise processing; the semantic recognition module is configured to extract element information of the controller instruction based on the speech recognition, to provide a guarantee for aircraft conflict recognition; the conflict recognition module is configured to deduce, based on a result of the semantic recognition, a process of each aircraft taxiing in accordance with the controller instruction and positions of the aircraft at each time point, analyze a aircraft conflict phenomenon including aircraft illegal approach during the taxiing, and generate an alarm signal based on a probability of an aircraft conflict; and the alarm display terminal is configured to display the result of the semantic recognition, the probability of an aircraft conflict, and detailed information of a possible conflict to the controller, and generate, based on the probability of the aircraft conflict, different levels of audible and visual alarms that are easy to distinguish.

As shown in FIG. 1, an airport control decision support method using the foregoing airport control decision support system based on semantic recognition of a controller instruction according to the present disclosure includes the following steps that are sequentially performed.

(1) Constructing a controller-specific speech database for safe operation of an airport;

The purpose of constructing a controller-specific speech database for safe operation of an airport is to fully reflect unique acoustic characteristics in a civil aviation control field and provide a complete data set for establishing a speech model. Based on an airport control workflow, a flight area-related operation management standard, information content of a controller instruction, and a controller's standard phrasebook "Radiotelephony Communications for Air Traffic Services", speech data and a pronunciation text are acquired in three ways: backing up a ground-air communication record between a controller in an airport and a pilot, using a VHF communication device or a tower speech access device to acquire information about a speech conversation between the controller and the pilot, and using a speech file of "Radiotelephony Communications for Air Traffic Services". the pronunciation text of the controller and the pilot are segmented, and the speech data with segments and prosody are marked, to form a data set composed of marked speech files that conform to airport control standard phrases. Finally, the controller-specific speech database for safe operation of an airport is constructed.

(2) The speech conversation between the controller and the pilot is acquired by a speech acquisition module based on the controller-specific speech database.

Based on the controller-specific speech database for safe operation of an airport and that is constructed by taking information about a speech conversation between the controller and the pilot in "Radiotelephony Communications for Air Traffic Services" as basic morphemes, controller instructions of seats including a release seat, a ground seat and a tower seat, and pilot speech are separately acquired, and then the foregoing speech model is trained based on an intelligent learning method, to accurately recognize speech of special terms of different seats.

(3) Noise processing is performed on the acquired speech conversation by a noise processing module.

Speech acquired at the airport is usually mixed with background sound with a certain intensity, and the background sound is usually VHF communication noise and high background noise of the airport, so that when the background noise has a relatively high intensity, the background noise will have a significant impact on subsequent speech recognition effect. Therefore, VHF communication noise and high background noise of the airport in the acquired speech conversation are filtered out by the noise processing module, so as to reduce noise interference, and an amplifier is added to increase a signal-to-noise ratio. The method is to extract a frequency spectrum of the noise, and then perform a reverse compensation operation for the speech with based on the frequency spectrum of the noise, so as to obtain a denoised speech conversation.

(4) Speech recognition is performed on the denoised speech conversation by a speech recognition module.

A speech recognition module with an airport control standard phrase recognition ability is constructed by a speech recognition model based on a neural network. Speech recognition on the speech conversation between the controller and the pilot is performed by the speech recognition module to obtain a recognized text. The speech recognition module performs the following specific operation steps.

Firstly, a denoised speech conversation signal is preprocessed, and feature parameters are extracted a denoised speech conversation signal based on the neural network. Then an acoustic model, a language model, and a dictionary are trained and recognized by the feature parameters. Finally the feature parameters are compared with the trained acoustic model, language model, and dictionary, and a corresponding probability is calculated by rules. A result that matches with a maximum probability of the feature parameters is selected to obtain a text for speech recognition.

The training refers to acquiring model parameters, evaluating the ability of the speech recognition model in recognizing airport control standard phrases, matching with the controller-specific special speech database, and optimizing the ability in fitting and generalizing the airport control standard phrases.

The recognition is a process of traversing the controller-specific speech database.

The acoustic model represents pronunciation of a language built based on the neural network, and can be trained to recognize a controller speech model and features of a tower environment;

The language model is a probability model that regularizes words of the controller-specific speech database.

The dictionary contains a large number of special professional terms and pronunciation rules in field a civil aviation control.

(5) Semantic recognition is performed on the speech conversation after the speech recognition by a semantic recognition module.

Based on the speech recognition of the controller and the pilot, element information including a flight number, push-out information, path information, a key position point, a starting point, and a time sequence is extracted from the controller instruction. Associatively analyzing a plurality of elements is performed. Semantic recognition on the speech conversation after the speech recognition is performed by using technical means such as word parsing, information extraction, time causality and emotion judgment and in combination with a configuration of an airport flight area. To improve accuracy of the semantic recognition, it is required to perform semantic recognition for a plurality of times on the speech conversation after the speech recognition and to acquire a large amount of speech data, the model in the semantic recognition module is continuously trained by using the data, and finally the text formed by the speech recognition module is converted into a planned taxiing path of the aircraft.

An aircraft conflict is recognized by a conflict recognition module with reference to the planned taxiing path formed by the semantic recognition module.

Based on the semantic recognition of the controller and the pilot, an process of each aircraft taxiing in accordance with the controller instruction and positions of the aircraft at each time point are deduced by the conflict recognition module with reference to historical data about aircrafts of different models taxiing in each area of the flight areas and relevant regulations on safe operation. Based on civil air traffic management rules and relevant normative documents of safe operation in flight areas, an aircraft conflict including aircraft illegal approach which may occur in the taxiing process is analyzed. An alarm signal is generated based on a probability of the aircraft conflict.

(7) Alarm information is displayed by an alarm display terminal.

Based on the aircraft conflict recognition, the semantically-recognized planned aircraft taxiing path, the probability of occurrence of an aircraft conflict, and detailed information of a possible conflict is displayed by the alarm display terminal to the controller. Based on the probability of a conflict, different levels of audible and visual alarms that are easy to distinguish are generated.

The airport control decision support system and method based on semantic recognition of a controller instruction according to the present disclosure are configured to recognize a controller instruction for aircraft ground taxiing guidance that is issued in an airport, deduce, based on a result of semantic recognition of the controller instruction, a taxiing process of aircrafts in accordance with the controller instruction and positions of the aircrafts at each time point, analyze aircraft conflict phenomenon including aircraft illegal approach during the taxiing, display a semantically-identified planned aircraft taxiing path, a probability of an aircraft conflict, and detailed information of a possible conflict to the controller, and generate, based on the probability of a conflict, different levels of audible and visual alarms that are easy to distinguish, which is suitable for an airport control decision support system in an existing t airport.

The content not described in detail in the description of the present invention is prior art known by those skilled in the art.

What is claimed is:

1. An airport control decision support system based on semantic recognition of a controller instruction, comprising:
   a speech acquisition module;
   a noise processing module;
   a speech recognition module;
   a semantic recognition module;
   a conflict recognition module; and
   an alarm display terminal,
   wherein the speech acquisition module is configured to acquire a speech conversation between a controller in an airport control seat and a pilot;
   the noise processing module is configured to filter out very high frequency (VHF) communication noise and high background noise of the airport in the acquired speech conversation, so as to reduce noise interference, and incorporates an amplifier to increase a signal-to-noise ratio;
   the speech recognition module is configured to perform, based on a constructed controller-specific speech database and speech characteristics of the controller and the pilot, speech recognition on the speech conversation after noise processing;
   the semantic recognition module is configured to extract element information of the controller instruction based on the speech recognition, to provide a guarantee for aircraft conflict recognition;
   the conflict recognition module is configured to deduce, based on a result of the semantic recognition, a process of an aircraft taxiing in accordance with the controller instruction and positions of the aircraft at each time point, analyze an aircraft conflict phenomenon comprising aircraft illegal approach during the taxiing, and generate an alarm signal based on a probability of an aircraft conflict; and
   the alarm display terminal is configured to display the result of the semantic recognition, the probability of the aircraft conflict, and detailed information of a possible conflict to the controller, and generate, based on the probability of the aircraft conflict, different levels of audible and visual alarms that are distinguishable.

2. An airport control decision support method using the airport control decision support system according to claim 1, wherein the airport control decision support method comprises the following steps that are sequentially performed:
   (1) constructing a controller-specific speech database for safe operation of an airport;
      acquiring, based on an airport control workflow, a flight area-related operation management standard, information content of a controller instruction, and a controller's standard phrasebook, speech data and a pronunciation text in three ways: backing up a ground-air communication record between a controller in an airport and a pilot, using a VHF communication device or a tower speech access device to acquire information about a speech conversation between the controller and the pilot, and using a speech file of the controller's standard phrasebook;
      segmenting the pronunciation text of the controller and the pilot, marking the speech data with segments and prosody, to form a data set composed of marked speech files that conform to airport control standard phrases, and finally constructing the controller-specific speech database for safe operation of an airport;

(2) acquiring, by a speech acquisition module, the speech conversation between the controller and the pilot based on the controller-specific speech database;

separately acquiring, based on the controller-specific speech database for safe operation of an airport, controller instructions of seats comprising a release seat, a ground seat and a tower seat, and pilot speech, and then training the speech based on an intelligent learning method, to accurately recognize speech of special terms of different seats;

(3) performing, by a noise processing module, noise processing on the acquired speech conversation;

filtering out, by the noise processing module, VHF communication noise and high background noise of the airport in the acquired speech conversation, and incorporating an amplifier to increase a signal-to-noise ratio; wherein the method is to extract a frequency spectrum of the noise, and then perform a reverse compensation operation for the speech with noise based on the frequency spectrum of the noise, so as to obtain a denoised speech conversation;

(4) performing, by a speech recognition module, speech recognition on the denoised speech conversation;

constructing, by a speech recognition model based on a neural network, a speech recognition module with an airport control standard phrase recognition ability; performing, by the speech recognition module, speech recognition on the speech conversation between the controller and the pilot to obtain a recognized text;

(5) performing, by a semantic recognition module, semantic recognition on the speech conversation after the speech recognition;

extracting, from the controller instruction, element information comprising a flight number, push-out information, path information, a key position point, a starting point, and a time sequence based on the speech recognition of the controller and the pilot, associatively analyzing a plurality of elements, performing, by using technical means comprising word parsing, information extraction, time causality and emotion judgment and in combination with a configuration of an airport flight area, semantic recognition for many times on the speech conversation after the speech recognition to acquire a large amount of speech data, continuously training the model in the semantic recognition module by using the data, and finally converting the text formed by the speech recognition module into a planned taxiing path of the aircraft;

(6) recognizing, by a conflict recognition module, an aircraft conflict with reference to the planned taxiing path formed by the semantic recognition module;

deducing, by the conflict recognition module, based on the semantic recognition of the controller and the pilot and with reference to historical data about aircrafts of different models taxiing in each area of the flight areas and relevant regulations on safe operation, a process of each aircraft taxiing in accordance with the controller instruction and positions of the aircraft at each time point, analyzing, based on civil air traffic management rules and relevant normative documents of safe operation in flight areas, an aircraft conflict phenomenon comprising aircraft illegal approach during the taxiing, and generating an alarm signal based on a probability of an aircraft conflict; and (7) displaying alarm information by an alarm display terminal;

displaying, by the alarm display terminal based on the aircraft conflict recognition, the semantically-recognized planned aircraft taxiing path, the probability of occurrence of the aircraft conflict, and detailed information of a possible conflict to the controller, and generating, based on the probability of a conflict, different levels of audible and visual alarms that are easy to distinguish.

3. The airport control decision support method according to claim 2, wherein in step (3), the speech recognition module performs following specific operation steps:

preprocessing a denoised speech conversation signal, extracting feature parameters from the denoised speech conversation signal based on the neural network, training and recognizing an acoustic model, a language model, and a dictionary by using the feature parameters, comparing the feature parameters with the trained acoustic model, language model, and dictionary, calculating a corresponding probability by using rules, and selecting a result that matches with a maximum probability of the feature parameters, to obtain a text for speech recognition.

4. The airport control decision support method according to claim 3, wherein the training refers to acquiring model parameters, evaluating the ability of the speech recognition model in recognizing airport control standard phrases, matching with the controller-specific speech database, and optimizing the ability in fitting and generalizing the airport control standard phrases;

the recognition is a process of traversing the controller-specific speech database;

the acoustic model represents pronunciation of a language built based on the neural network, and is capable of being trained to recognize a controller speech model and features of a tower environment;

the language model is a probability model that regularizes words of the controller-specific speech database; and the dictionary contains many unique professional terms and pronunciation rules in field of a civil aviation control.

* * * * *